UNITED STATES PATENT OFFICE.

JOSEPH BURSK, OF STERLING, ILLINOIS.

BLACKING.

1,174,308. Specification of Letters Patent. Patented Mar. 7, 1916.

No Drawing. Application filed August 28, 1915. Serial No. 47,746.

*To all whom it may concern:*

Be it known that I, JOSEPH BURSK, a citizen of the United States, residing at Sterling, in the county of Whiteside and State of Illinois, have invented certain new and useful Improvements in Blacking, of which the following is a specification.

The purpose of my invention is to provide a dressing for leather containing few ingredients, none of which will be injurious to the material to which it is applied, and which can be produced by a simple process, without grinding or any operation similar thereto. The composition produced is of a lasting quality, when properly applied to the leather, and tends to keep the same soft and pliable.

The ingredients which are used in producing the compound, and the proportions thereof, are substantially as follows: ivory-black, two pounds; molasses, one quart; neat's-foot oil, two ounces.

To prepare the blacking, the molasses is heated until it boils, whereupon the ivory-black is added and thoroughly mixed therewith. When this mixture is partially cooled the neat's-foot oil is added, the composition thus produced being a black paste, which can be placed in cans or boxes ready for use. This paste will form a perfect coating for leather, and will thoroughly conceal blotches, stains and even paint-spots thereon, and it possesses unusual lasting qualities. It does not harden quickly, but when kept in boxes for a time will require moistening upon being used.

Slight changes can be made in the proportions and method of producing said composition without departing from the spirit of the invention.

What I claim as my invention, and desire to secure by Letters-Patent of the United States, is:

A blacking consisting of ivory-black, molasses, and neat's-foot oil, in substantially the proportions named, and prepared as above set forth.

In testimony whereof I affix my signature in presence of two witnesses.

JOSEPH BURSK.

Witnesses:
 W. N. HASKELL,
 FRANK W. HASKELL.

Copies of this patent may be obtained for five cents each, by addressing the "Commissioner of Patents, Washington, D. C."